(12) United States Patent  
Kim

(10) Patent No.: US 7,533,280 B2  
(45) Date of Patent: May 12, 2009

(54) EMERGENCY CALL APPARATUS AND METHOD FOR SMART PHONE

(75) Inventor: Pil-Jun Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 309 days.

(21) Appl. No.: 10/969,126

(22) Filed: Oct. 20, 2004

(65) Prior Publication Data

US 2005/0097380 A1    May 5, 2005

(30) Foreign Application Priority Data

Nov. 5, 2003 (KR) ............... 10-2003-0078140

(51) Int. Cl.  
*G06F 1/00* (2006.01)
(52) U.S. Cl. .............................. 713/310; 379/41
(58) Field of Classification Search .......... 379/41; 713/300  
See application file for complete search history.

(56) References Cited

U.S. PATENT DOCUMENTS 5,167,024 A * 11/1992 Smith et al. ............ 713/322
5,646,535 A * 7/1997 Dornier .................. 324/556
5,999,526 A * 12/1999 Garland et al. .......... 370/352
2002/0001367 A1* 1/2002 Lee ........................ 379/41
2002/0039916 A1* 4/2002 Hosoi ..................... 455/572
2004/0005044 A1* 1/2004 Yeh ....................... 379/142.01

FOREIGN PATENT DOCUMENTS

JP    06-006283    *    1/1994

\* cited by examiner

*Primary Examiner*—Thomas Lee  
*Assistant Examiner*—Mohammed H Rehman  
(74) *Attorney, Agent, or Firm*—The Farrell Law Firm, PC

(57) ABSTRACT

An emergency call apparatus and method for a smart phone are disclosed in which the apparatus includes a personal data assistant unit including a telephone power control unit for generating a telephone power-on signal when an emergency call requirement occurs in a state in which the telephone unit is powered off, and an emergency call number storage unit for storing an emergency call number, the personal data assistant unit sending a call set-up command to the telephone unit; a power supply for supplying power the telephone unit and the personal data assistant unit; a first power path connected to the power supply, for sending power to the personal data assistant unit; a second power path connected to the power supply, for sending power to the telephone unit in response to the power-on signal; and an on-screen keyboard which enables a user to make an emergency call.

10 Claims, 2 Drawing Sheets

EMERGENCY CALL APPARATUS AND METHOD FOR SMART PHONE

PRIORITY

This application claims priority to an application entitled "Emergency Call Apparatus And Method For Smart Phone" filed in the Korean Intellectual Property Office on Nov. 5, 2003 and assigned Serial No. 2003-78140, the contents of which are hereby incorporated by reference.

BACKGROUND OF THE INVENTION

1. Field of the Invention

The present invention relates to an emergency call apparatus and method of a mobile communication terminal, and more particularly to an emergency call apparatus and method for utilizing a smart phone.

2. Description of the Related Art

In order to use an emergency call function in a mobile communication terminal having a telephone function, a user must push a soft key or input an emergency call number such as 112, 911, or 999 in a state in which a telephone unit is powered on.

However, typically, a smart phone includes a telephone unit and a personal data assistant (hereinafter referred to as a PDA) unit. When only a PDA function is used, the smart phone is used in a state in which the telephone unit is powered off. Accordingly, when a situation requiring an emergency call occurs while only the PDA function is being used, the user must turn on the power of the telephone unit by means of the PDA unit and must try to initiate an emergency call in a manner similar to when using a general telephone.

SUMMARY OF THE INVENTION

Accordingly, the present invention has been made to solve the above-mentioned problems occurring in the prior art, and an object of the present invention is to provide an apparatus and a method which enables performance of a quick emergency call by means of a smart phone when in a state in which its telephone unit is powered off and its personal data assistant unit is powered on.

In order to accomplish the aforementioned object, according to one aspect of the present invention, there is provided an emergency call apparatus for a smart phone capable of independently turning off power of a telephone unit while supplying power to a personal data assistant unit, the emergency call apparatus including: the telephone unit having an emergency call performing unit; the personal data assistant unit having a telephone power control unit for generating a telephone power-on signal when an emergency call is required when the telephone unit is powered off, and an emergency call number storage unit for storing an emergency call number, the personal data assistant unit sending a call set-up command to the telephone unit; a power supply for supplying power to the telephone unit and the personal data assistant unit; a first power path connected to the power supply, for sending power to the personal data assistant unit; and a second power path connected to the power supply, for sending power to the telephone unit in response to the power-on signal.

In order to accomplish the aforementioned object, according to another aspect of the present invention, there is provided an emergency call method for a smart phone capable of independently turning off only power of a telephone unit, the smart phone including the telephone unit and a personal data assistant unit, the method including the steps of determining, by the personal data assistant unit, whether a user is trying to make a call, and determining whether the telephone unit is powered on when it is detected that the user is trying to make the call; determining, by the personal data assistant unit, whether an emergency call number is inputted when the telephone unit is powered off; generating, by the personal data assistant unit, a telephone power supply control signal for controlling power to be supplied from a power supply to the telephone unit when the emergency call number is inputted; powering on and initializing the telephone unit in response to the telephone power supply control signal; and the personal data assistant unit ordering a call set-up to drive the telephone unit and the telephone unit performing an emergency call.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of to the present invention will be described with reference to the accompanying drawings. In the following description, many particular items, such as specific telephone numbers 112, 911 or 999, are shown, but these are provided for helping the general understanding of the present invention, it will be understood by those skilled in the art that the present invention can be embodied without such particular items. In the following description of the present invention, a detailed description of known functions and configurations incorporated herein is omitted to avoid making the subject matter of the present invention unclear.

Figure 1:
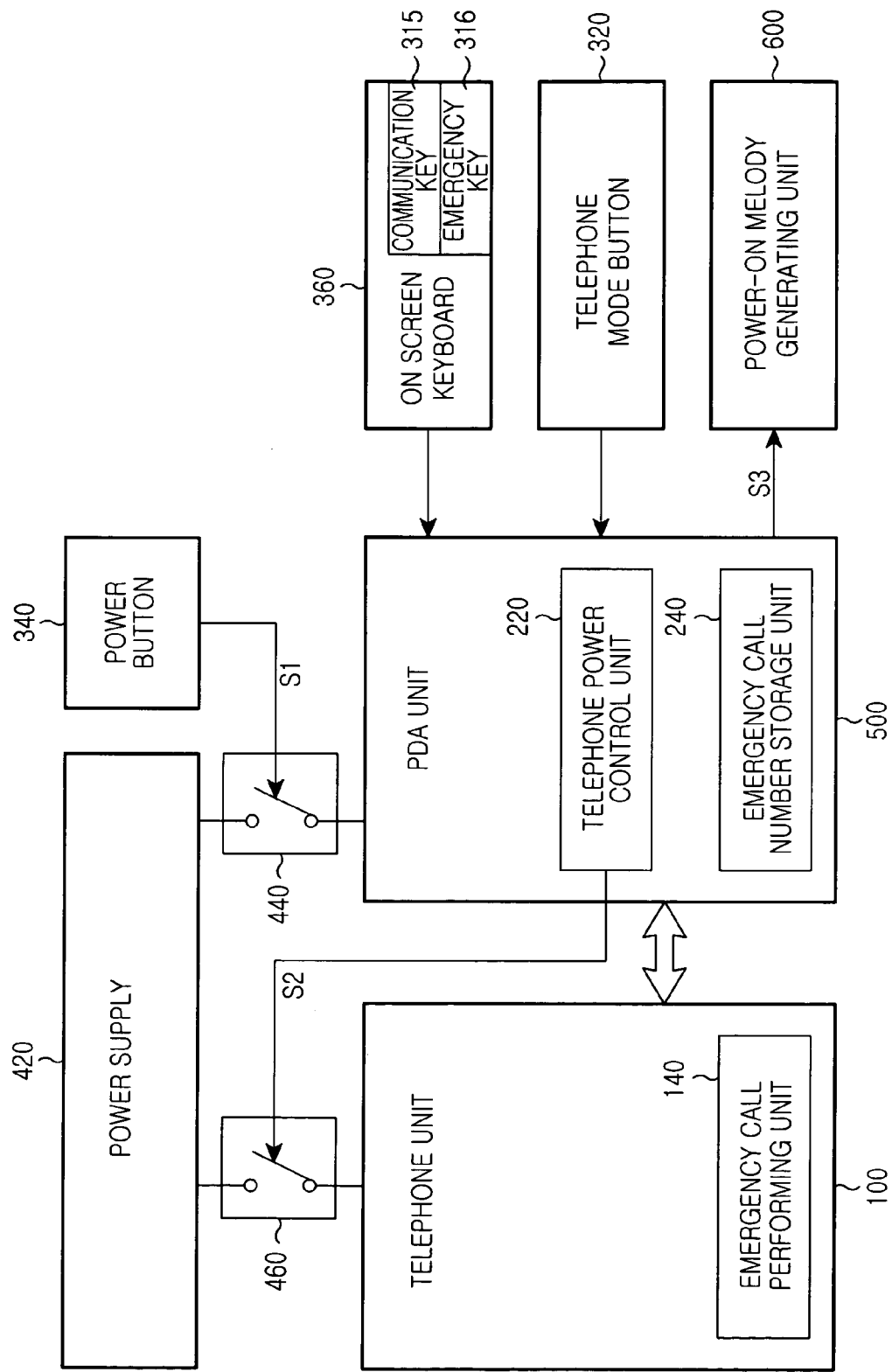
FIG. 1 is a block diagram showing an emergency call apparatus for a smart phone according to a preferred embodiment of the present invention.

Referring now to FIG. 1, the smart phone includes a telephone unit 100 and a PDA unit 500. The telephone unit 100 includes an emergency call performing unit 140. The PDA unit 500 includes a telephone power control unit 220 and an emergency call number storage unit 240. The telephone power control unit 220 generates a telephone power on/off signal S2 and the emergency call number storage unit 240 stores emergency call numbers in advance.

A telephone mode button 320 independently turns off only power of the telephone unit 100, and the power of the telephone unit 100 may be turned off when the smart phone is used only for a PDA function.

A power supply 420 supplies power to the PDA unit 500 through a first power path 440 and power to the telephone unit 100 through a second power path 460.

A power button 340 turns on/off the smart phone. When a user pushes the power button 340, the first power path 440 connects the PDA unit 500 to the power supply 420, so that the PDA unit 500 is powered on. Then, the second power path 460 connects the telephone unit 100 to the power supply 420, by telephone power on/off control signal S2 received from the telephone power control unit 220 of the PDA unit 500, so that the telephone unit 100 is powered on.

An on-screen keyboard 360 is a user interface preferably provided via a touch pad and a liquid crystal display. The user may push the emergency call numbers and a communication key 315 or an emergency call key 316 on the on-screen keyboard 360 using a stylus pen or similar means. Further, the user may turn on/off the power of the phone by means of a phone menu provided on the display.

A power-on melody generating unit 600 generates a melody for recognition of the user when the phone is powered on. However, in an emergency call mode, the melody is not generated when an inhibition signal S3 is outputted from the PDA unit 500.

Figure 2:
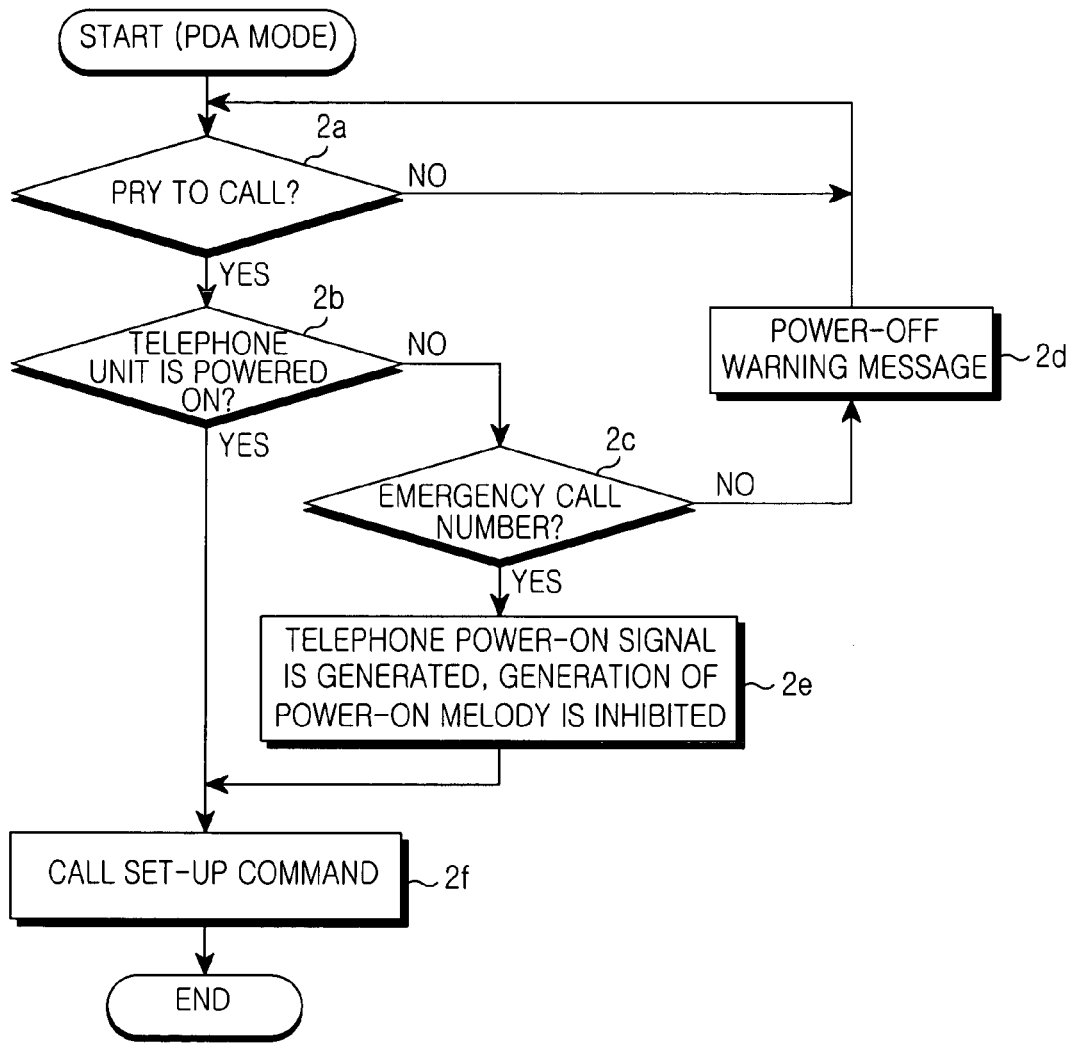
FIG. 2 is a flowchart illustrating an emergency call method for a smart phone according to a preferred embodiment of the present invention.

Turning now to FIG. 2, in step 2a, the PDA unit 500 checks whether a user is trying to make a call. From the result of the check, when it is detected that the user is trying to make the call, the PDA unit 500 checks whether or not the telephone unit 100 is powered on in step 2b. This may be determined by checking the telephone power control unit 220.

When the telephone unit 100 is powered off, the PDA unit 500 checks whether an emergency call number is inputted in step 2c. That is, the PDA unit 500 checks whether a phone number coinciding with the phone number to which the user has tried to make a call exists in the emergency call number storage unit 240. When the phone number is found to exist in the emergency call number storage unit 240, the telephone power on/off signal S2 is generated in step 2e, so that the second power path 460 connects the telephone unit 100 to the power supply 420. Therefore, the telephone unit 100 is powered on. Through these steps, power is supplied to the telephone unit 100 and an initialization is performed. Further, in step 2e, the PDA unit 500 generates the inhibition signal S3 to control the power-on melody generating unit 600 and not to generate a melody. Herein, this is a selective item considering an emergency situation.

After step 2e, step 2f is performed. That is, the PDA unit 500 sends a call set-up command to the telephone unit 100, so that the emergency call performing unit 140 of the telephone unit 100 performs an emergency call. The call set-up command includes the emergency call number.

From the result of the check in step 2c, when the emergency call number is not inputted, step 2d is performed. That is, the PDA unit 500 generates a power-off warning message. Then, step 2a is performed again.

A process performed in a sequence of step 2a→step 2b→step 2f corresponds to a case in which a general call or an emergency call occurs when the telephone unit 100 is powered on.

In the present invention as described above, when a user tries an emergency call when a telephone unit is powered off, the telephone unit is automatically powered on without an operation in which the user turns on the power of the telephone unit by using a PDA unit, so that the emergency call may be quickly performed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An emergency call apparatus for a smart phone including a telephone unit and a personal data assistant unit, the emergency call apparatus comprising:
   the telephone unit including an emergency call performing unit;
   the personal data assistant unit including an emergency call number storage unit for storing at least one emergency call number and a telephone power control unit for comparing a phone number inputted by a user with stored emergency call numbers when the telephone unit is powered off, and generating a telephone power-on signal for activating the telephone unit if the inputted phone number is identical to one of the stored emergency call numbers, the personal data assistant unit sending a call set-up command to the telephone unit;
   a power supply for supplying power to the telephone unit and the personal data assistant unit;
   a first power path connected to the power supply, for sending power to the personal data assistant unit; and
   a second power path connected to the power supply, for sending power to the telephone unit in response to the telephone power-on signal,
   wherein power to the telephone unit is independently turned off while power to the personal data assistant unit continues to be supplied, and
   wherein the telephone power-on signal turns the telephone unit from an off-mode to an on-mode in order to transmit an emergency call.

2. The emergency call apparatus as claimed in claim 1, further comprising a display having an on-screen keyboard which enables a user to make an emergency call.

3. The emergency call apparatus as claimed in claim 1, further comprising a power button for turning on!off the smart phone, wherein when the user pushes the power button, the first power path connects the personal data assistant unit to the power supply to allow the personal data assistant unit to be powered on and the second power path then connects the telephone unit to the power supply to power on the telephone unit.

4. The emergency call apparatus as claimed in claim 3, wherein the telephone power control unit of the personal data assistant unit controls powering on of the telephone unit.

5. The emergency call apparatus as claimed in claim 1, further comprising a power-on melody generating unit for generating a melody when the phone is powered on, wherein an inhibition signal outputted from the personal data assistant unit causes the generating unit not to generate the melody when in an emergency call mode.

6. An emergency call method for a smart phone including a telephone unit and a personal data assistant unit, the method comprising the steps of:
   a) independently turning off power only to a telephone unit, while maintaining power to the personal data assistant unit;
   b) determining, by the personal data assistant unit, whether a user is trying to make a call using a user interface, and determining whether the telephone unit is powered on when it is detected that the user is trying to make the call;
   c) comparing, by the personal data assistant unit, a phone number inputted by the user with pre-stored emergency call numbers when the telephone unit is powered off;
   d) generating, by the personal data assistant unit, a telephone power supply control signal for providing power to be supplied from a power supply to the telephone unit when the inputted phone number is identical to one of the stored emergency call numbers;
   e) powering on and initializing the telephone unit in response to the telephone power supply control signal; and
   f) the personal data assistant unit ordering the telephone unit to set up a call and the telephone unit performing an emergency call,
   wherein the telephone power-on signal turns the telephone unit from an off-mode to an on-mode in order to transmit an emergency call.

7. The method as claimed in claim 6, further including generating a power-off warning message when it is determined that the emergency call number is not inputted in step c) and returning to step b).

8. The method as claimed in claim 6, wherein in step c) the personal data assistant unit determines whether at least one emergency call number stored in advance is equal to the emergency call number inputted by the user.

9. The method as claimed in claim 6 further including not generating a power-on melody when it is determined that the emergency call number is inputted in step c).

10. The method as claimed in claim 6, wherein the call set-up command includes the emergency call number.

* * * * *